United States Patent
Samuelsson et al.

(10) Patent No.: US 7,533,413 B2
(45) Date of Patent: May 12, 2009

(54) METHOD AND SYSTEM FOR PROCESSING EVENTS

(75) Inventors: Anders M. E. Samuelsson, Redmond, WA (US); Thomas F. Fakes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 10/729,096

(22) Filed: Dec. 5, 2003

(65) Prior Publication Data

US 2005/0125685 A1 Jun. 9, 2005

(51) Int. Cl.
*G06F 11/00* (2006.01)
*G06F 12/16* (2006.01)
*G06F 15/18* (2006.01)
*G08B 23/00* (2006.01)

(52) U.S. Cl. .............................. 726/22; 726/23; 726/24; 726/25

(58) Field of Classification Search ................. 713/200; 726/24, 25, 22, 23
See application file for complete search history.

(56) References Cited

U.S. PATENT DOCUMENTS

| | | | |
|---|---|---|---|
| 4,104,721 A | 8/1978 | Markstein et al. | |
| 4,970,504 A * | 11/1990 | Chen | 340/5.26 |
| 6,006,328 A * | 12/1999 | Drake | 726/23 |
| 6,119,236 A * | 9/2000 | Shipley | 726/22 |
| 6,158,010 A | 12/2000 | Moriconi et al. | |
| 6,173,404 B1 * | 1/2001 | Colburn et al. | 726/17 |
| 6,178,173 B1 * | 1/2001 | Mundwiler et al. | 370/410 |
| 6,301,668 B1 * | 10/2001 | Gleichauf et al. | 726/25 |
| 6,408,391 B1 * | 6/2002 | Huff et al. | 726/22 |
| 6,513,721 B1 | 2/2003 | Salmre et al. | |
| 6,530,024 B1 * | 3/2003 | Proctor | 726/23 |
| 6,606,710 B2 | 8/2003 | Krishnan et al. | |
| 6,684,244 B1 | 1/2004 | Goldman et al. | |
| 6,789,202 B1 | 9/2004 | Ko et al. | |
| 6,910,135 B1 * | 6/2005 | Grainger | 726/23 |
| 7,000,247 B2 | 2/2006 | Banzhof | |
| 7,010,807 B1 * | 3/2006 | Yanovsky | 726/24 |
| 7,093,292 B1 | 8/2006 | Pantuso | |
| 7,203,962 B1 * | 4/2007 | Moran | 726/23 |
| 2003/0051154 A1 * | 3/2003 | Barton et al. | 713/201 |
| 2003/0065942 A1 * | 4/2003 | Lineman et al. | 713/201 |
| 2003/0204632 A1 * | 10/2003 | Willebeek-LeMair et al. | 709/249 |
| 2003/0236994 A1 * | 12/2003 | Cedar et al. | 713/200 |
| 2004/0003266 A1 | 1/2004 | Moshir et al. | |

(Continued)

OTHER PUBLICATIONS

Jai Sundar Balasubramaniyan, Jose Omar Garcia-Fernandez, David Isacoff, Eugene Spafford, and Diego Zamboni. An Architecture for Intrusion Detection using Autonomous Agents. In 14th IEEE Computer Security Applications Conference, Dec. 1998.*

(Continued)

*Primary Examiner*—Kambiz Zand
*Assistant Examiner*—Benjamin A Kaplan
(74) *Attorney, Agent, or Firm*—Lee & Hayes, PLLC

(57) ABSTRACT

An event, such as a security-related event, is received from a first security engine or another source. A second security engine is identified that is configured to utilize information contained in the event. The information contained in the event is then communicated to the second security engine. Additionally, other information, such as system state information, can be provided to one or more security engines.

29 Claims, 6 Drawing Sheets

U.S. PATENT DOCUMENTS

| | | | |
|---|---|---|---|
| 2004/0015719 A1* | 1/2004 | Lee et al. | 713/201 |
| 2004/0064731 A1* | 4/2004 | Nguyen et al. | 713/201 |
| 2004/0139004 A1* | 7/2004 | Cohen et al. | 705/39 |
| 2004/0260945 A1* | 12/2004 | Raikar et al. | 713/201 |
| 2005/0044418 A1 | 2/2005 | Miliefsky | |
| 2005/0125694 A1* | 6/2005 | Fakes et al. | 713/201 |
| 2005/0262362 A1 | 11/2005 | Patrick et al. | |
| 2006/0021002 A1* | 1/2006 | Townsend et al. | 726/1 |

OTHER PUBLICATIONS

Montesi; "Analysis and optimization of active databases"; Data & Knowledge Engineering, vol. 40, No. 3; pp. 241-271; Mar. 2002; Netherlands.

Montesi; "A Transaction Transformation Approach to Active Rule Processing"; IEEE Comput. Soc. Press, Los Alamitos, CA, USA; 1995; pp. 109-116.; Proceedings of the Eleventh International Conference on Data Engineering.

Park, et al; "Mini-Savepoints: Firewall for Atomic Updates"; Database Systems for Advanced Applications '97; Proceedings of the Fifth International Conference; pp. 293-302; Apr. 1-4, 1997.

Caldwell; "The Importance of Event Correlation for Effective Security Management"; Information Systems Control Journal; vol. 6; 2002; pp. 36-38.

Krugel, et al; "Decentralized Event Correlation for Intrusion Detection"; ICICS 2001; pp. 114-131; vol. 2288; Dec. 6-7, 2001.

"Database Two Phase Commit Software Technology Review", retrieved on Sep. 30, 2007, at <<http://web.archive.org/web/20020219183616/www.sei.smu.edu/str/descriptions/dtpc_body.html>>, Carnegie Mellon University, 2001, pp. 5.

Date, "An Introduction to Database Systems", Addison Wesley Longman Inc., 2000, pp. 5.

Dubie, "LANDesk Punches up Patch Management Suite", at <<http://www.networkworld.com/news/2003/0707patch.html>>, Network World, Jul. 2003, pp. 2.

Ulfelder, "Practical Patch Management", at <<http://www.networkworld.com/supp/security2/patch.html>>, Network World, Oct. 2002, pp. 8.

* cited by examiner

200 →

DATA
  A=1
  B=4
  C=2
  .
  .
  .

RULES
  IF A=0 THEN PERFORM PROCESS X
  IF A=1 THEN GENERATE MESSAGE 214
  IF A>1 THEN HALT PROCESS Z
  .
  .
  .

| DATA ELEMENT | SECURITY ENGINES |
|---|---|
| A | 1 |
| B | 1, 2 |
| C | 2, 5 |
| D | 1, 4, 6 |
| E | 2, 3 |
| . | . |
| . | . |
| . | . |

*Fig. 3*

METHOD AND SYSTEM FOR PROCESSING EVENTS

TECHNICAL FIELD

The systems and methods described herein relate to computing systems and, more particularly, to processing events such as security-related events.

BACKGROUND

Computer systems are continuing to grow in popularity and are frequently interconnected with other computer systems via networks, such as local area networks (LANs) and the Internet. Features such as electronic mail (email), instant messaging, and online entertainment encourage the use of computer systems coupled to networks. These features allow users to, for example, communicate with other users, retrieve audio and/or video content, and purchase products or services via online sources.

This increased interconnection of computer systems increases the likelihood of attacks against the computer systems by malicious users. These attacks may include installing a malicious program onto other users' computers (e.g., intended to disable the other users' computers, to obtain information from the other users' computers, launch attacks against other computers, and the like). Attacks may also include attempting to disable a computer such that its performance is greatly impaired (e.g., by generating a continuous stream of requests sent to the computer). These attacks can be a nuisance to the computer user and may result in lost data, corrupted data, confidential data being copied from the computer, or rendering the computer inoperable.

To prevent or minimize the severity of such attacks, various security programs and services have been developed. These programs and services execute on the computer system and protect the computer system from malicious attacks. Example programs include antivirus programs and firewall programs. Typically, these programs or services are directed toward preventing a particular type of attack. For example, an antivirus program protects against the loading and/or execution of computer viruses, and a firewall program protects against unauthorized access to the computer by an outside user.

These different programs do not typically communicate with one another. For example, an antivirus program does not typically communicate the fact that a virus was detected to the firewall program. Thus, the various security programs in a computer system may not learn of certain attacks on the computer system. It would be desirable to provide an improved communication mechanism for communicating security-related information and other events among various security programs and services in a computer system.

SUMMARY

The systems and methods described herein enhance the security of a computing system by sharing events, such as security-related events, among multiple security engines. In a particular embodiment, an event is received from a first security engine. A second security engine is identified that can utilize information contained in the event. The information contained in the event is then communicated to the second security engine.

BRIEF DESCRIPTION OF THE DRAWINGS

Similar reference numbers are used throughout the figures to reference like components and/or features.

FIG. 2 illustrates an example security policy containing data and rules.

FIG. 3 illustrates an example table maintained by a security module regarding data requested by various security engines.

DETAILED DESCRIPTION

The systems and methods discussed herein process various information, such as events generated by one or more programs or services. A computing system includes an event manager that receives events and other information from multiple sources, such as security engines and other computing systems. Example security engines include antivirus engines, firewall engines and intrusion detection engines. The event manager communicates event information received from a particular source to one or more security engines that might use the information to improve the level of security provided for the computing system.

Although particular examples discussed herein refer to security-related events and other security-related information, alternate embodiments may process any type of event or information. This information includes any information that might be utilized by security-related components in a host computer. Alternate embodiments can receive, process and distribute information that is not necessarily related to the security of the host computer.

Figure 1:
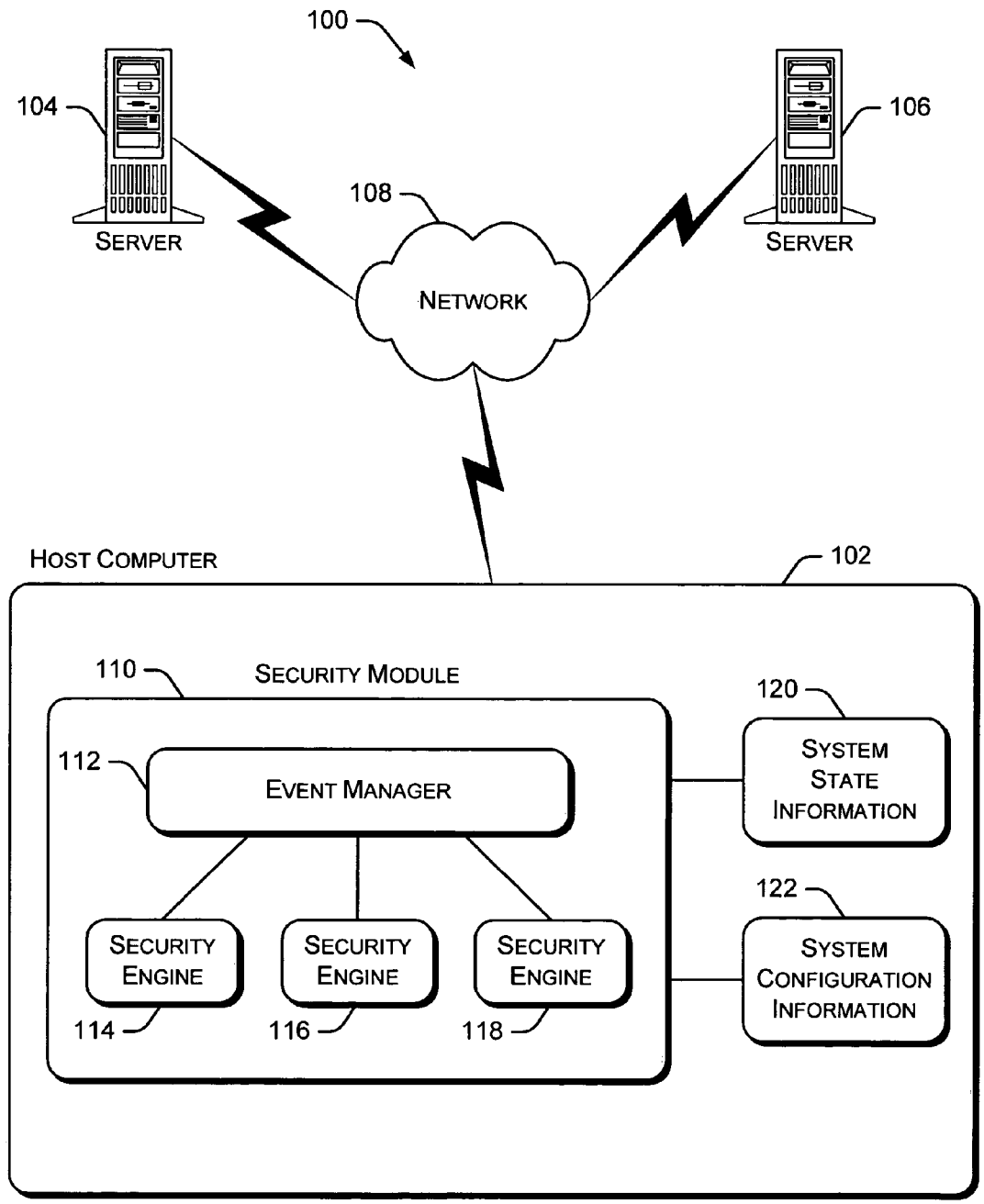
FIG. 1 illustrates an example environment in which various events are generated and processed.

FIG. 1 illustrates an example environment 100 in which various events are generated and processed. Events include, for example, detection of a computer virus, detection of an attempt to access confidential data, notification that a computer virus was destroyed, notification that a particular application program was halted or prevented from executing, changes to system state information, and so forth. A host computer 102 is coupled to multiple servers 104 and 106 via a network 108. Host computer 102 and servers 104 and 106 may be any type of computing device, such as the device discussed below with respect to FIG. 7. Network 108 can be any type of data communication network, such as a local area network (LAN), wide area network (WAN), the Internet, and the like. Although FIG. 1 illustrates host computer 102 being coupled to two servers 104 and 106, host computer 102 may be coupled to any number of servers or other devices capable of communicating with the host computer.

Host computer 102 includes a security module 110 that performs various security-related functions, such as monitoring, detecting and responding to attacks on host computer 102. Security module 110 includes an event manager 112 that is coupled to three security engines 114, 116 and 118. Security engines 114-118 may be implemented in software, hardware, or a combination of software and hardware. A security engine can be any service that assists in protecting against malicious users and/or malicious programs. Particular security engines are security-related application programs, such as antivirus programs and intrusion detection programs. Security engines 114-118 may also be referred to as "services". A particular security module 110 may include any number of security engines coupled to event manager 112. Security module 110 may also include other modules, components, or application programs (not shown), such as a security-related policy reader or other policy-handling mechanism.

Security module 110 is also coupled to system state information 120 and system configuration information 122. System state information 120 includes information regarding the current operating state or operating mode of host computer 102. System configuration information 122 includes information regarding how host computer 102 is configured. System state information 120 and system configuration information 122 may be stored in a non-volatile storage device, such as a memory device or a hard disk drive. In one embodiment, event manager 112 and security engines 114-118 are capable of receiving system state information 120 and system configuration information 122.

Although not shown in FIG. 1, additional data sources or data providers may communicate information and events to security module 110 and event manager 112. This additional data includes, for example, configuration information related to an Internet Information Service (IIS), data provided by an system management application, data contained in a system registry, and information provided by a user or administrator of the system.

Each security engine 114-118 performs certain security-related functions to help secure host computer 102 from malicious users or application programs. These malicious users or application programs may attempt to disable host computer 102 or disable functionality of host computer 102, obtain data from host computer 102 (such as passwords or other confidential information), or use host computer 102 (such as to assist in attacking other computer systems). For example, security engine 114 detects computer viruses, security engine 116 provides firewall protection, and security engine 118 blocks execution of is particular application programs based on one or more user privileges or characteristics. In this example, security engine 114 protects host computer 102 from being infected by computer viruses, worms, Trojan horses, and the like. Additionally, firewall protection includes protecting host computer 102 from being accessed over a network connection by other devices. Blocking execution of particular application programs includes preventing execution of application programs on host computer 102 by a user that does not have appropriate privileges. Additionally, execution of an application program may be blocked if improper behavior is detected, such as improper network access or improper storage device access.

In other embodiments, one or more security engines may perform intrusion detection or vulnerability analysis. Intrusion detection includes, for example, identifying when a malicious application program and/or user has accessed host computer 102 and taking appropriate action to notify a user or administrator, attempt to disable the malicious application program, or halt the malicious user's access. Vulnerability analysis includes, for example, attempting to detect vulnerabilities in host computer 102 due to security engines or other components that have not been installed or updated correctly, security engines or other components that have not been configured properly, patches or hot fixes that have not been installed, passwords that do not comply with required lengths or required characters, and the like. A particular security engine 114-118 may be unaware of the existence and functionality of other security engines coupled to event manager 112.

Each security engine 114-118 communicates events (e.g., detection of a computer virus, detection of an attempt to retrieve data from host computer 102, or preventing execution of an application program by a user) to event manager 112. These events include information collected by a security engine, actions taken by a security engine, data collected by the event manager from one or more data sources, and the like. Example information includes a listing of all virtual servers instantiated in a particular installation. Event manager 112 processes these events and communicates the information contained in particular events to other search engines 114-118 that may benefit from such information.

Security module 110 also receives security-related policies that include one or more rules and various data. Event manager 112 distributes the rules to the appropriate security engines 114-118 and provides data to the security engines, as needed. Each security engine 114-118 stores these rules and data received from event manager 112. The operation of security module 110, event manager 112 and security engines 114-118 is discussed in greater detail below.

FIG. 2 illustrates an example security policy 200 containing data and rules. In one embodiment, security policy 200 is stored in security module 110. A particular security module may receive and store any number of different security policies 200 received from any number of different data sources. Alternatively, security policy 200 may be stored in another module or component within host computer 102. In the example of FIG. 2, a data portion 202 of security policy 200 includes one or more data elements. As shown in FIG. 2, these data elements include values assigned to variables (e.g., a value of "1" is assigned to variable "A" and a value of "4" is assigned to variable "B"). In alternate embodiments, other types of data may be included instead of or in addition to the data shown in FIG. 2. The data contained in security policy 200 is used, for example, by one or more rules contained in security policy 200 or contained in one or more other security policies.

Security policy 200 also includes a rules portion 204 that contains multiple rules. The rules in security policy 200 may be associated with one or more security engines. For example, certain rules may only be applied by particular security engines. The rules may be arranged in security policy 200 based on the security engine with which the rules are associated. Alternatively, an identifier associated with each rule may identify the security engines that are capable of applying the rule. In particular embodiments, a rule may be associated with any number of security engines. In other embodiments, a host computer may not contain a security engine that applies a particular rule. In this situation, the rule is not associated with any security engine.

In the example of FIG. 2, the rules are defined using an IF-THEN structure. Alternatively, the set of rules can take a variety of different forms. Using the IF-THEN structure shown in FIG. 2, the rule defines a particular condition(s) and a corresponding particular action(s) or result(s). During enforcement of the rule, if that particular condition(s) is detected, then the corresponding particular action(s) or result(s) is performed. A rule can identify a variety of different conditions and corresponding actions or results. Example conditions include attempts to access a resource (e.g., memory locations, network addresses or ports, other programs, or files on a storage device), attempts to write data to particular locations (e.g., particular memory locations, or particular locations on a storage device), attempts to run particular programs, and various aspects of the current operating state of host computer 102. Example results include preventing a resource from being accessed, preventing data from being written to particular locations, preventing a program from being executed, or generating a notification that the occurrence of the condition in the rule was detected (e.g., recording its occurrence in a log, or sending a message to a user or other computer). The particular results can also be permissive in nature rather than preventive. For example, the results could indicate that a particular resource or location can be accessed only if the condition in the rule is satisfied by host computer 102, or that a particular program can only be run if the condition in the rule is satisfied by host computer 102.

Additional examples of rules include permitting certain application programs or services to update data files in a particular directory or folder, enabling receipt of traffic on port 21 if file transfer protocol (FTP) is enabled, and generating a virus warning message if a particular virus signature is detected. Other examples include generating an event if a particular application program has not been upgraded to a particular revision level, preventing access to a network if the application program has not been upgraded to a minimum revision level, and preventing the host computer from receiving data via network port 35.

FIG. 3 illustrates an example table 300 maintained by a security module regarding data requested by various security engines. In one embodiment, table 300 is stored in security module 110. Alternatively, table 300 may be stored in another module or component within host computer 102. Each time a security engine requests data from the security module, the security module updates the table (if necessary) to include that data request. A first column 302 of table 300 identifies a particular data element, such as a variable or other identifier or information. A second column 304 of table 300 identifies any security engines that previously requested the associated data element. For example, table 300 identifies that data element "A" was previously requested by security engine "1". Similarly, data element "D" was previously requested by security engines "1", "4" and "6". As discussed in greater detail below, the information contained in table 300 is used by the security module to determine which security engines should receive updated data.

Figure 4:
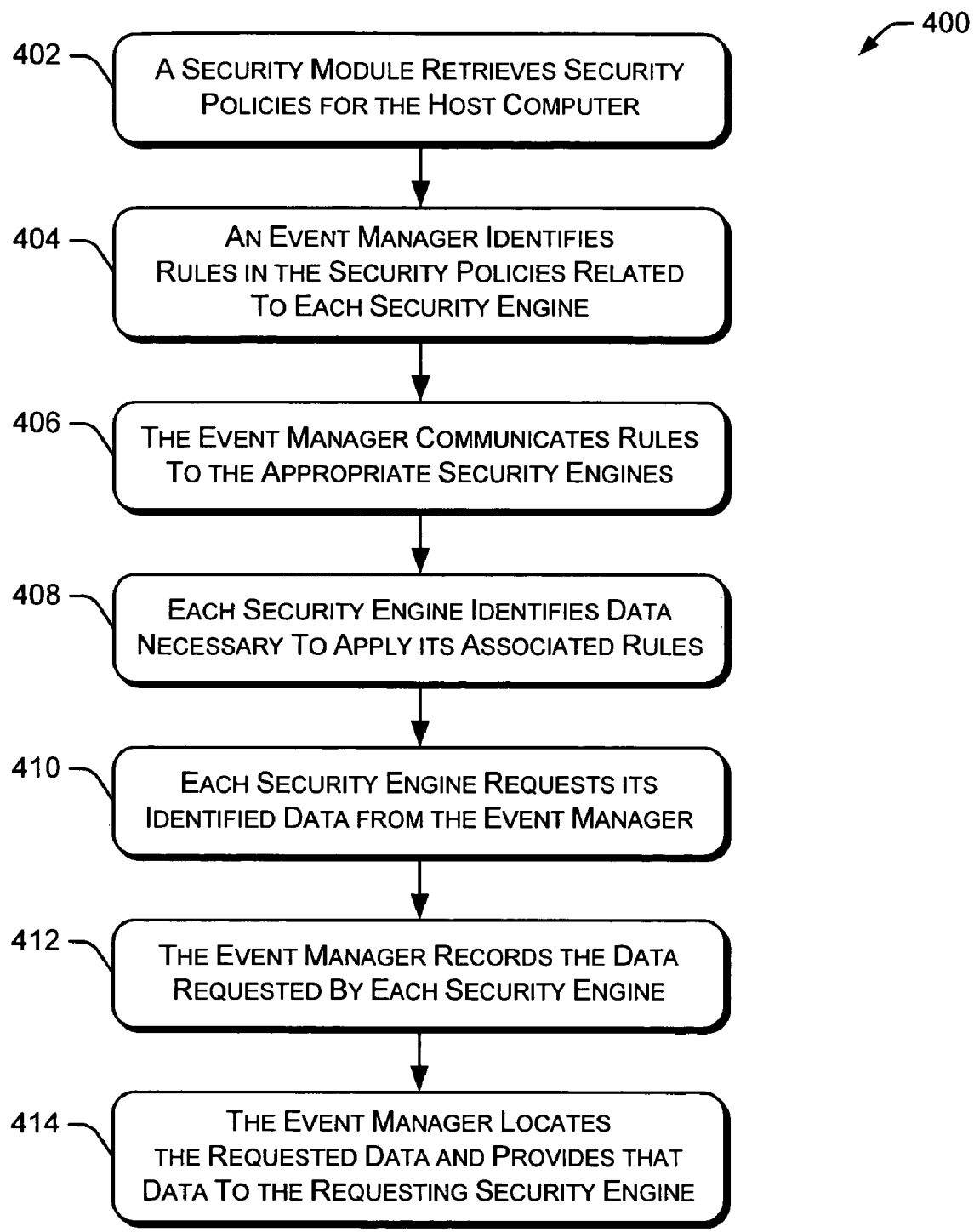
FIG. 4 is a flow diagram illustrating an embodiment of a procedure for retrieving and distributing security policy rules and data.

FIG. 4 is a flow diagram illustrating an embodiment of a procedure 400 for retrieving and distributing security policy rules and data. Procedure 400 may be performed, for example, upon initialization of a host computer. Initially, a security module retrieves security policies for the host computer (block 402). A event manager identifies rules in the security policies related to each security engine (block 404). The event manager then communicates the rules to the appropriate security engines (block 406).

Each security engine identifies data necessary to apply its associated rules (block 408), for example by identifying data elements contained in rules that the security engine will apply. Each security engine then requests its identified data from the event manager (block 410). After receiving a data request from a security engine, the event manager records the requested data element in a table (e.g., table 300 in FIG. 3) or other data structure for future reference (block 412). Finally, the event manager locates the requested data and provides that data to the requesting security engine (block 414). Thus, rather than providing all data to all security engines, the event manager provides the requested data to each requesting security engine.

Figure 5:
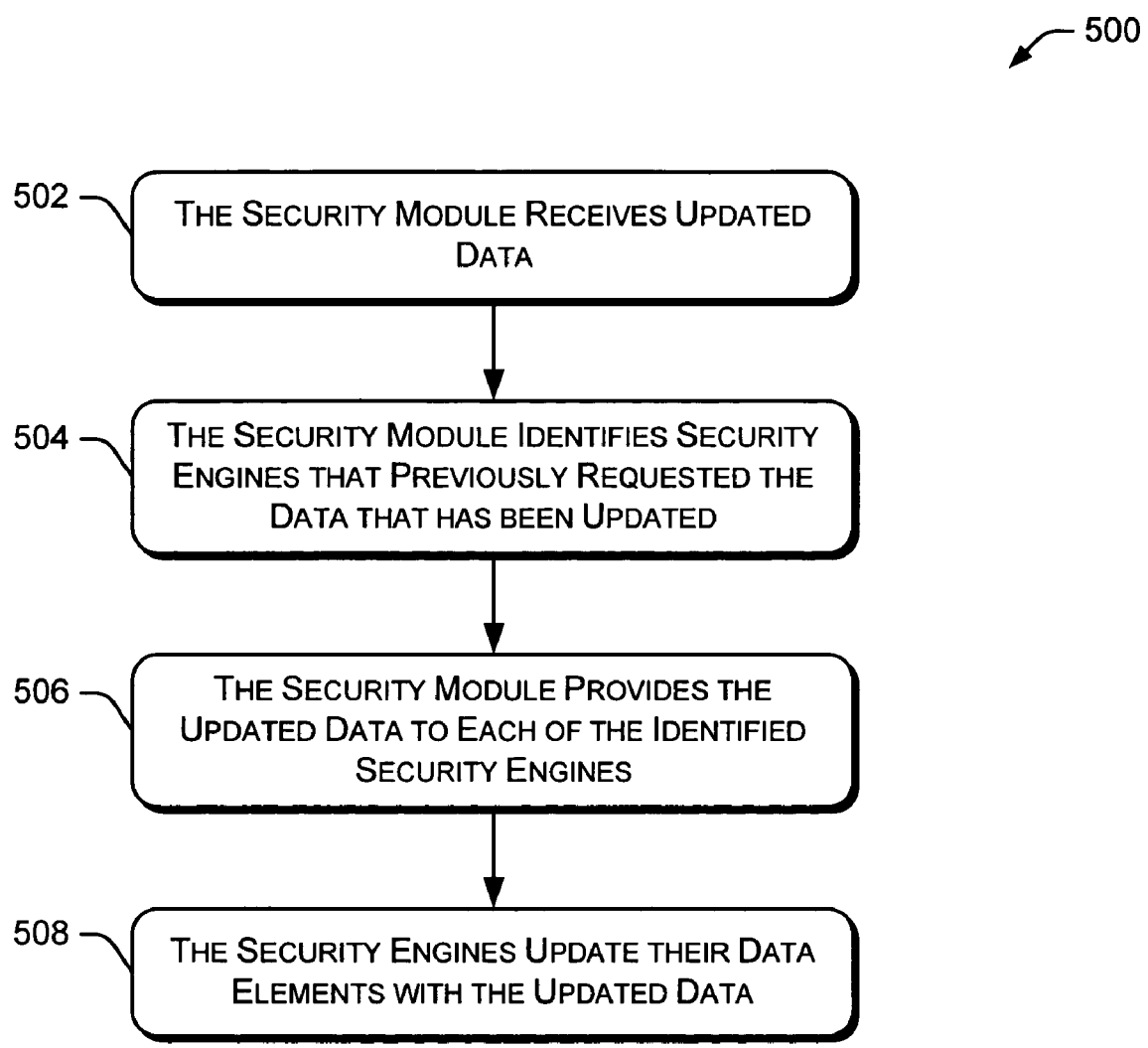
FIG. 5 is a flow diagram illustrating an embodiment of a procedure for handling updated security policy data.

FIG. 5 is a flow diagram illustrating an embodiment of a procedure 500 for handling updated security policy data. Initially, the security module receives updated data (block 502). For example, the updated data may include updated values for existing variables. The security module identifies one or more security engines that previously requested the data that has been updated (block 504). In one embodiment, the security module identifies these security engines using a table such as table 300 shown in FIG. 3. After identifying the appropriate security engines, the security module provides the updated data to each of the identified security engines (block 506). Finally, the security engines update their data elements with the updated data. Procedure 500 is repeated each time the security module receives updated data. In another embodiment, the security module periodically checks various data sources for updated data. If the data has been updated, the security module retrieves the updated data and distributes the data according to procedure 500.

In one embodiment, when a rule is updated, the security module identifies the security engines associated with the rule and distributes the updated rule to the identified security engines. If a new rule is received, the security module identifies the security engines that might use the new rule and distributes the new rule to the appropriate security engines. Similarly, if an existing rule is deleted, the security module deletes the rule from all security engines associated with the rule. In another embodiment, when a rule is updated, the security module creates a new set of rules (including the updated rule) and distributes the new set of rules to the security engines, thereby replacing the existing rules contained in the security engines.

Figure 6:
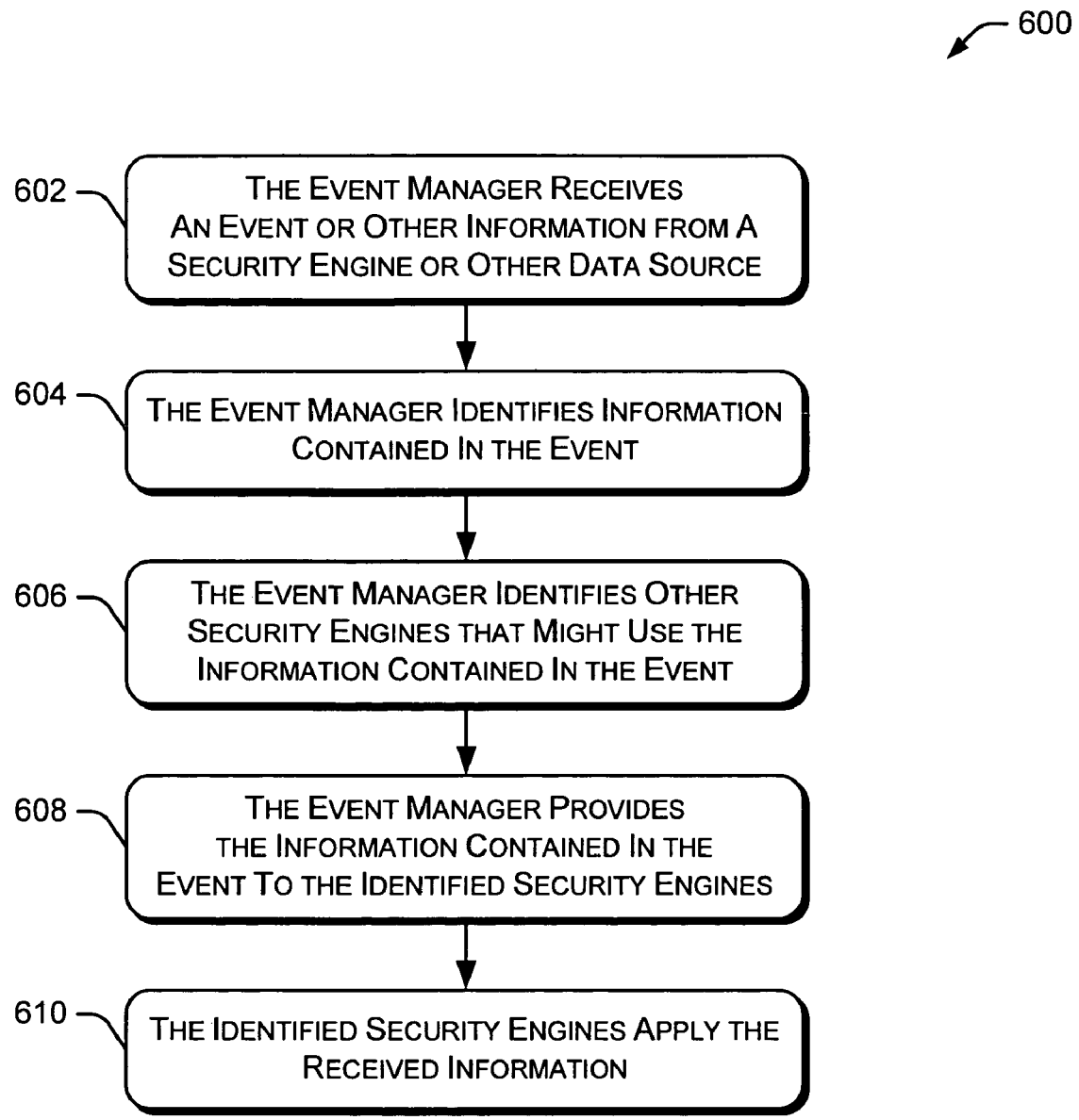
FIG. 6 is a flow diagram illustrating an embodiment of a procedure for handling the distribution of information to one or more security engines.

FIG. 6 is a flow diagram illustrating an embodiment of a procedure 600 for handling the distribution of information, such as event information or system state information, to one or more security engines. Initially, the event manager receives an event from a security engine (block 602). The event manager then identifies information contained in the event (block 604), such as the event type or the nature of the attack that generated the event. The event manager also identifies other security engines that might use the information contained in the event (block 606). The relationships among different security engines are specified, for example, in the security policy received by the host computer. These relationships may be defined wholly or in part by a system administrator or other system operator when creating the security policy. A particular security engine can publish certain data that it knows about, even though the security engine may not know whether any other devices or applications will use the data. An administrator can specify this data, for example, in rules provided to other security engines.

Next, the event manager provides the information contained in the event to the identified security engines (block 608). The identified security engines then apply the received information (block 610). This sharing (or correlation) of event information enhances the level of security provided by a host computer against malicious attacks. Sharing of the event information is handled by the event manager such that the individual security engines do not need to know of the other security engines contained in the host computer. The security-related information discussed herein can be stored in a central location, thereby allowing other devices, components and application programs to access the information. For example, other security engines or computing systems may access the stored security related information.

In one example of procedure 600, an antivirus security engine detects repeated attempts to access a network via a particular port. The antivirus security engine reports this information (e.g., dates and times of the attempted access and the port on which access was attempted) to the event manager. In this example, the antivirus security engine is not responsible for responding to such access attempts. The event manager receives the information from the antivirus security engine and determines that an intrusion detection security engine and a firewall security engine may use such information. After receiving the information, the intrusion detection security engine and the firewall security engine may adjust their operation based on the received information. For example, the intrusion detection security engine may increase the frequency with which it checks for intruders. Additionally, the firewall security engine may temporarily disable the port on which access was attempted. Thus, the overall security of the host computer against attacks is increased by allowing security engines to adjust their operation based on shared information regarding security-related events.

In another example of procedure 600, a vulnerability security engine detects whether a particular patch is installed on the host computer. If the patch is not installed, the vulnerability security engine generates an event indicating that the patch is not installed. A host firewall security engine and a behavioral blocking security engine have registered with the event manager for notification if the patch is not installed. When the host firewall security engine and the behavioral blocking security engine receive notification of the patch not being installed, the security engines enforce rules that limit the functionality (or prevent execution) of the application program that was not patched.

In another example a particular security engine identifies all servers on a specific type of network, such as domain controllers. The identified information is shared with one or more other security engines. The security engines may apply rules that have different behaviors depending on whether specific network addresses are being accessed.

In another embodiment, system state information is shared among various components (e.g., the event manager and multiple security engines) in the security module. The system state information may be provided by various data sources. Example system state information includes a current network state, whether a network connection is wired or wireless, whether the host computer is accessing a corporate network or an unknown network, and host computer configuration information. Thus, if a security engine identifies particular system state information, that identified information can be shared among other security engines and other components or modules in the host computer.

In a particular embodiment, the system state information collected by various components is stored in a central location, thereby providing access to the information by other devices, components and application programs. For example, system state information collected by one security engine is accessible by other security engines, security modules and computing systems.

Figure 7:
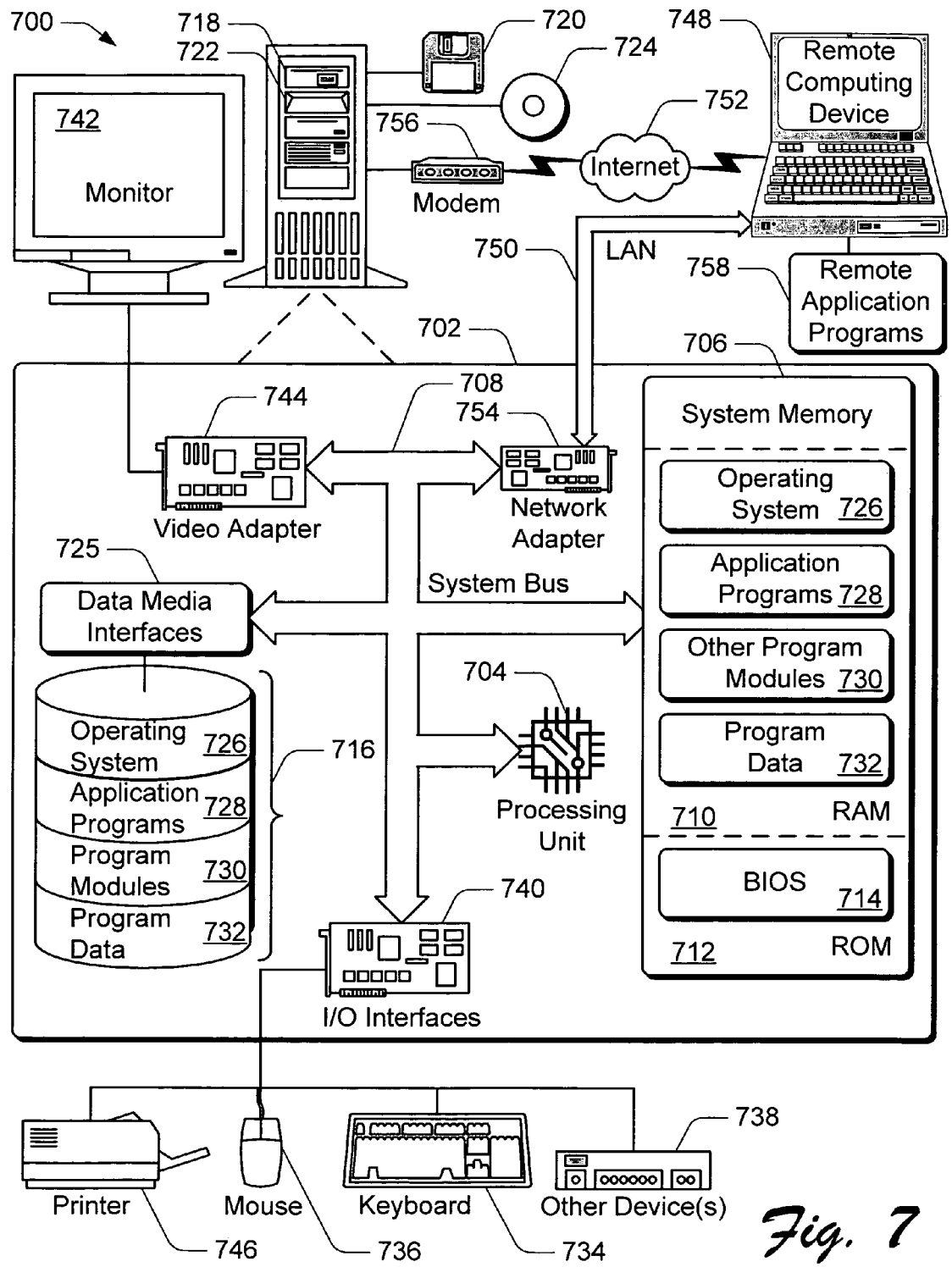
FIG. 7 illustrates a general computer environment, which can be used to implement the techniques described herein.

FIG. 7 illustrates a general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

Computer environment 700 includes a general-purpose computing device in the form of a computer 702. One or more media player applications can be executed by computer 702. The components of computer 702 can include, but are not limited to, one or more processors or processing units 704 (optionally including a cryptographic processor or co-processor), a system memory 706, and a system bus 708 that couples various system components including the processor 704 to the system memory 706.

The system bus 708 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 725. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device I 1748. By way of example, the remote computing device 748 can be a personal computer, portable computer, a server, a router, a network computer, a peer device or other common network node, game console, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving an event from a first security engine;
   identifying a second security engine configured to utilize information contained in the event, wherein the second security engine is unaware of the first security engine; and
   communicating the information contained in the event to the second security engine via an event manager, wherein the event corresponds to identifying a password that does not comply with predetermined criteria; and
   with the first security engine, the second security engine, and the event manager being included and executed in a single host computer.

2. A method as recited in claim 1 wherein the event identifies a password that does not comply with a length criteria.

3. A method as recited in claim 1 wherein the event identifies an action performed by the first security engine in response to a detected vulnerability.

4. A method as recited in claim 1 wherein the first security engine and the second security engine are application programs.

5. A method as recited in claim 1 wherein the event identifies a password that does not include one or more required characters.

6. A method as recited in claim 1 wherein the first security engine is a vulnerability analysis application program.

7. A method as recited in claim 1 further comprising:
identifying a third security engine configured to utilize information contained in the event; and
communicating the information contained in the event to the third security engine.

8. A method as recited in claim 1 further comprising:
receiving an updated security policy;
identifying at least one security engine that previously requested the security policy; and
providing the updated security policy to the identified security engine.

9. A method as recited in claim 1 further comprising:
receiving a request for data from the first security engine; and
communicating the requested data to the first security engine.

10. A method as recited in claim 1 further comprising storing information contained in the event in a central location accessible to a plurality of security engines.

11. One or more computer-readable memories containing a computer program that is executable by a processor to perform the method recited in claim 1.

12. A method comprising:
receiving a security-related event from a first security-related application program, the security-related event being associated with a system state;
identifying information contained in the security-related event;
identifying a second security-related application program associated with the information contained in the security-related event, wherein the second security-related application program is unaware of the first security-related application program;
communicating the information contained in the security-related event to the second security-related application program via an event manager; and
with the first security-related application program, the second security-related application program, and the event manager being included and executed in a single host computer.

13. A method as recited in claim 12 wherein the information includes whether a network connection is wired or wireless.

14. A method as recited in claim 12 wherein the information includes whether a host computer is accessing a corporate network.

15. A method as recited in claim 12 wherein the information includes whether a host computer is accessing an unknown network.

16. A method as recited in claim 12 further comprising:
receiving system state information from a third security-related application program; and
storing the system state information such that the system state information is accessible to the first security-related application program and the second security-related application program.

17. A method as recited in claim 12 further comprising:
identifying a third security-related application program associated with the information contained in the security-related event; and
communicating the information contained in the security-related event to the third security-related application program.

18. One or more computer-readable memories containing a computer program that is executable by a processor to perform the method recited in claim 12.

19. One or more tangible computer-readable media having stored thereon a computer program executed by one or more processors, comprising:
a first security engine associated with a first type of security attack, the first security engine including configuration to detect a password that does not comply with predetermined criteria;
a second security engine associated with a second type of security attack, wherein the second security engine is unaware of the first security engine;
an event manager coupled to receive events from the first security engine and the second security engine, the event manager further to identify information contained in the events and to identify at least one security engine associated with information contained in a particular event, and further to communicate the information contained in the particular event to the at least one security engine and
with the first security engine, the second security engine, and the event manager being included and executed in a single host computer.

20. One or more tangible computer-readable media as recited in claim 19 wherein the information contained in the events identifies a type of security attack.

21. One or more tangible computer-readable media as recited in claim 19 wherein the information contained in each event identifies an action taken in response to a security attack.

22. One or more tangible computer-readable media as recited in claim 19 wherein the information contained in the events includes system state information.

23. One or more tangible computer-readable media as recited in claim 19 further comprising a third security engine coupled to the event manager and associated with a third type of security attack.

24. One or more tangible computer-readable media as recited in claim 19 further comprising a storage device coupled to the event manager, the first security engine and the second security engine, the storage device to store event information.

25. One or more tangible computer-readable media having stored thereon a computer program that, when executed by one or more processors, causes the one or more processors to:
receive a first security-related event from a first service, the first security-related event corresponding to a network-related aspect of a system state;
identify information contained in the first security-related event;
receive a second security-related event from a second service, wherein the second service is unaware of the first service;
identify information contained in the second security-related event;
communicate information contained in the first security-related event to the second service via an event manager;
communicate information contained in the second security-related event to the first service via the event manager; and
with the first service, the second service, and the event manager being included and executed in a single host computer.

26. One or more tangible computer-readable media as recited in claim 25 wherein the first security-related event identifies a particular type of security attack.

27. One or more tangible computer-readable media as recited in claim 25 wherein the one or more processors further store the information contained in the first security-related event and the information contained in the second security-related event for access by other services.

28. One or more tangible computer-readable media as recited in claim 25 wherein the one or more processors further communicate information contained in the first security-related event to a third service.

29. One or more tangible computer-readable media as recited in claim 25 wherein the first service is associated with a first type of security attack and the second service is associated with a second type of security attack.

* * * * *